(12) United States Patent
Ishizuka et al.

(10) Patent No.: US 8,860,949 B2
(45) Date of Patent: Oct. 14, 2014

(54) INTERFEROMETER

(75) Inventors: Ko Ishizuka, Saitama (JP); Ryo Sasaki, Utsunomiya (JP); Koichi Masegi, Machida (JP)

(73) Assignee: Canon Kabushiki Kaisha (JP)

( * ) Notice: Subject to any disclaimer, the term of this patent is extended or adjusted under 35 U.S.C. 154(b) by 327 days.

(21) Appl. No.: 13/150,825

(22) Filed: Jun. 1, 2011

(65) Prior Publication Data
US 2011/0299093 A1    Dec. 8, 2011

(30) Foreign Application Priority Data

Jun. 3, 2010   (JP) ................................. 2010-128276

(51) Int. Cl.
*G01B 11/02*   (2006.01)
*G01D 5/26*   (2006.01)

(52) U.S. Cl.
CPC ..................................... *G01D 5/266* (2013.01)
USPC ....................................................... 356/499

(58) Field of Classification Search
CPC .................................................... G01D 5/266
USPC ................. 356/499, 521; 250/231.18, 231.16
See application file for complete search history.

(56) References Cited

U.S. PATENT DOCUMENTS

| | | | | |
|---|---|---|---|---|
| 4,360,730 A | * | 11/1982 | Breslow | 250/231.13 |
| 4,967,072 A | * | 10/1990 | Nishimura | 250/231.16 |
| 5,064,290 A | * | 11/1991 | McMurtry et al. | 356/499 |
| 5,555,039 A | * | 9/1996 | Iki et al. | 351/205 |
| 5,574,559 A | * | 11/1996 | Kaneda et al. | 356/499 |
| 6,075,603 A | | 6/2000 | O'Meara et al. | |
| 6,958,469 B2 | * | 10/2005 | Ishizuka | 250/231.16 |
| 8,228,508 B2 | * | 7/2012 | Ishizuka | 356/499 |

FOREIGN PATENT DOCUMENTS

| | | |
|---|---|---|
| EP | 1 306 646 A1 | 5/2003 |
| JP | 05-133732 A | 5/1993 |
| JP | 2003-254784 A | 9/2003 |
| JP | 2005-331254 A | 12/2005 |

OTHER PUBLICATIONS

Extended European Search Report for EP 11164038.9, mail date Mar. 6, 2014.

\* cited by examiner

*Primary Examiner* — Michael A Lyons
*Assistant Examiner* — Shawn Decenzo
(74) *Attorney, Agent, or Firm* — Rossi, Kimms & McDowell LLP

(57) ABSTRACT

An interferometer measures a displacement of an object to be measured by observing a fluctuation in intensity of interfering light generated by dividing light emitted from a light source into two light beams and overlaying the two light beams. The interferometer includes: a light-receiving unit including a light-receiving area including a plurality of partial areas and configured to detect the interfering light in each of the plurality of partial areas; and a processing unit configured to calculate a value of an index indicating uniformity of a phase distribution of the interfering light in the light-receiving area by using a detection result in each of the partial areas.

11 Claims, 5 Drawing Sheets

INTERFEROMETER

BACKGROUND OF THE INVENTION

1. Field of the Invention

The present invention relates to an interferometer such as an interference type encoder.

2. Description of the Related Art

A conventional diffraction interference type rotary encoder needs to be adjusted to a so-called "one color state" by checking the state of interference fringes in an image when mounting the encoder on a mechanical member including a plurality of adjustment mechanisms for the spacing between the head unit and the disk unit, a positional shift in the radial direction, the tilt of the head, and the like. In this specification, a "one color state" is defined as a state in which the light/dark phases are uniform on the entire surface of the light-receiving unit for interfering light. For example, the interference between ideal plane waves corresponds to a case in which the angle difference between the principal rays of two light beams is 0°. The interference between spherical waves corresponds to a case in which the virtual point light sources of two light beams coincide with each other in a space. The interference between wavefronts with some distortions corresponds to a state in which the wavefronts of two light beams completely overlay each other. In addition, a "one color degree" is defined as the number of interference fringes (including numbers after the decimal point) on the light-receiving surface, which is defined as 0 in a perfect one color state. When the size of a light beam is small relative to the light-receiving unit, a one color degree is applied to the size of the light beam. In addition, one color degrees are respectively defined relative to two coordinate axes V and H on the light-receiving surface. For example, these one color degrees will be referred to as a "V-axis direction one color degree" and an "H-axis direction one color degree", respectively.

When mounting a module type encoder with a separate head and disk in an apparatus, the user cannot acquire any interference fringe image as information inside the encoder. For this reason, in general, the mounting posture of an encoder is adjusted, based on only the amplitude of a periodic signal output from the encoder head, so as to maximize the amplitude. This applies to general geometric optics module type encoders as well as diffraction interference type encoders. For example, Japanese Patent Laid-Open No. 5-133732 discloses a technique of allowing a user to find a better adjusted state by presenting information indicating the quality of a mounted state based on the amplitude of a periodic signal.

According to the prior art, however, techniques to adjust interferometers have not been standardized and have required the intuitions and experiences of users who perform mounting operation, in order to adjust the interferometers to optimal states. That is, for example, since it is not clear which part is to be adjusted to what extent, the user keeps searching for a position where a better signal state is obtained, by determining an increase/decrease in signal upon actual adjusting operation. Interferometers and high-precision diffraction interference type encoders, in particular, need to be adjusted to an ideal one color state. However, such adjustment has depended on the skill of the user who performs mounting operation.

SUMMARY OF THE INVENTION

The present invention therefore provides an interferometer allowing easy adjustment.

The present invention in its first aspect provides an interferometer which measures a displacement of an object to be measured by observing a fluctuation in intensity of interfering light generated by dividing light emitted from a light source into two light beams and overlaying the two light beams, the interferometer comprising: a light-receiving unit including a light-receiving area including a plurality of partial areas and configured to detect the interfering light in each of the plurality of partial areas; and a processing unit configured to calculate a value of an index indicating uniformity of a phase distribution of the interfering light in the light-receiving area by using a detection result in each of the partial areas.

Further features of the present invention will become apparent from the following description of exemplary embodiments with reference to the attached drawings.

DESCRIPTION OF THE EMBODIMENTS

Interferometers according to the first to third embodiments of the present invention will be described in detail below with reference to the accompanying drawings. The interferometers shown in the first to third embodiments are diffraction interference type rotary encoders which measure angle changes. However, an interferometer of the present invention may be of another type as long as it measures the displacement of an object to be measured by observing fluctuations in the intensity of interfering light generated by dividing light emitted from a light source into two light beams and overlaying them.

[First Embodiment]

Figure 1:
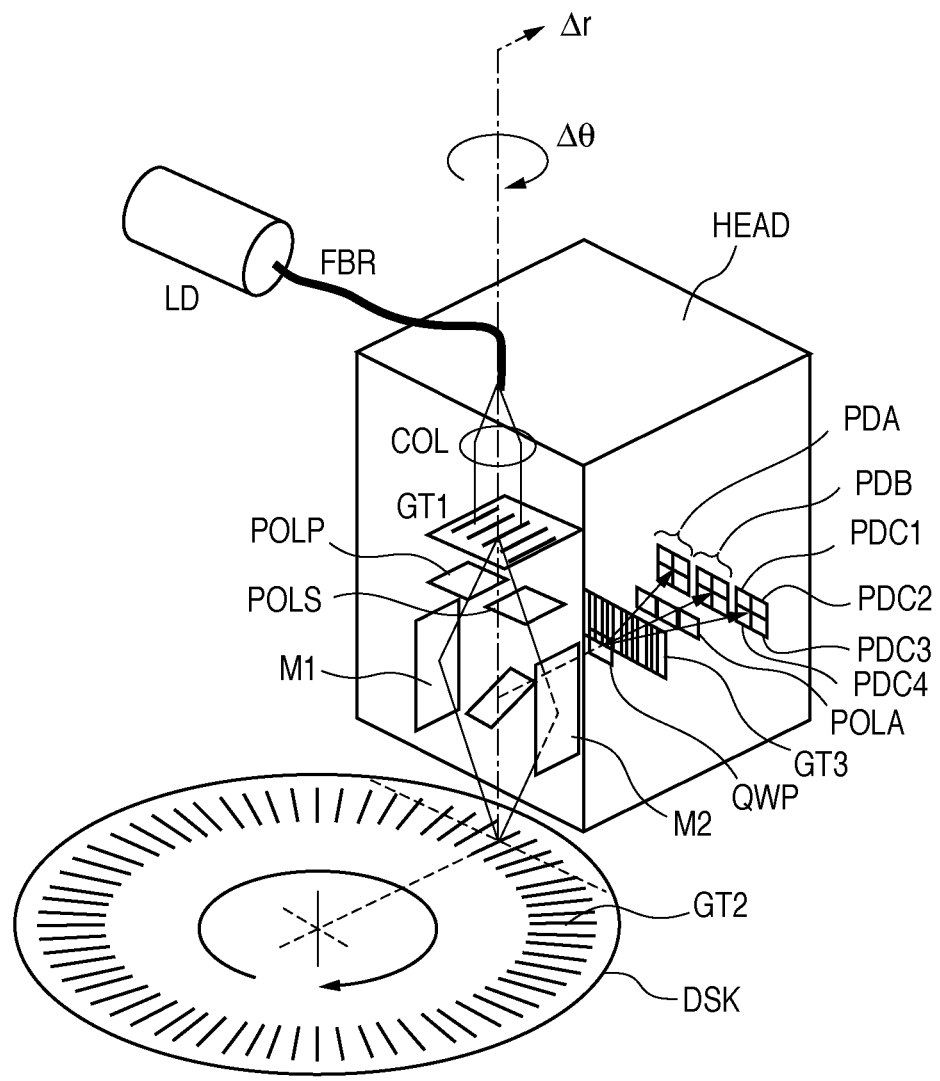
FIG. 1 is a view showing the arrangement of the head unit of an encoder having a function of displaying a one color degree in the first embodiment.
Figure 2:
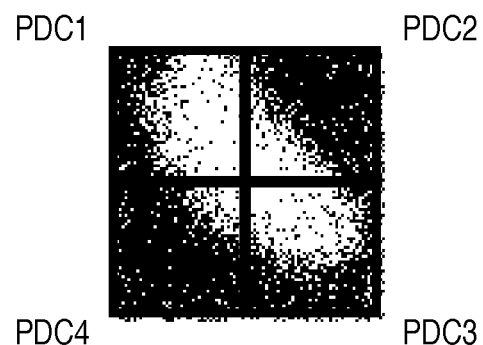
FIG. 2 is a view showing interference fringes on the light-receiving element of the encoder in the first embodiment.
Figure 3:
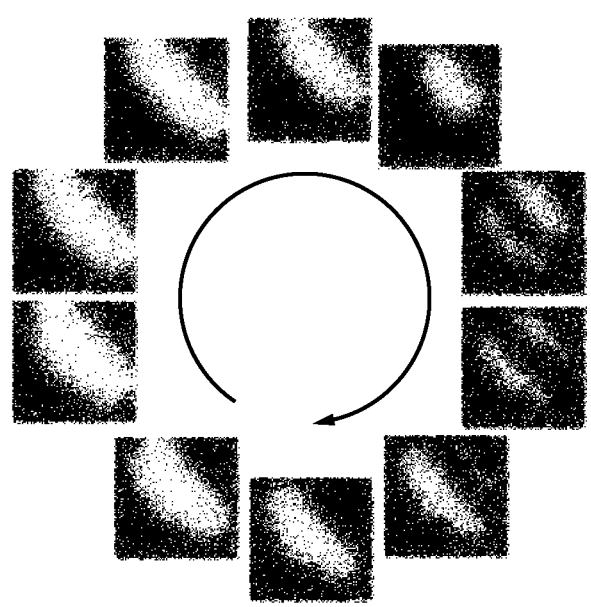
FIG. 3 is a view showing how the light/dark distribution of interference fringes on the light-receiving element of the encoder in the first embodiment changes with the rotation of a disk.

FIG. 1 is a view showing the arrangement of the head unit and disk unit of the diffraction interference type rotary encoder according to the first embodiment. As shown in FIG. 1, a laser light source LD emits a light beam as diverging light via an optical fiber FBR. A collimator lens COL collimates the emitted light beam. A diffraction grating GT1 divides the parallel light into two light beams which are ±1st-order diffracted light beams. Polarizing units POLP and POLS convert +1st-order light into P-polarized light, and −1st-order light into S-polarized light, respectively. The P-polarized light and S-polarized light obliquely illuminate, via parallel mirrors M1 and M2, respectively, a radial diffraction grating GT2 on a disk DSK which rotates relative to the light source LD. Illuminating the radial diffraction grating GT2 at a position where the pitch of the diffraction grating GT1 becomes equal to that of the diffraction grating GT2 makes the ±1st-order diffracted light beams vertically emerge from the diffraction grating GT2 with their optical paths coaxially overlaying. These two light beams are linearly polarized light beams whose polarization planes are perpendicular to each other. These light beams are therefore transmitted through a ¼-wavelength plate QWP and further divided into three light beams, that is, 0th-order, +1st-order, and −1st-order light beams, by a diffraction grating GT3. The three divided light beams are transmitted through a 3-channel polarizing plate array POLA having polarization light transmission axes at 0°, +60°, and −60° directions to irradiate three light-receiving units (light-receiving elements) with 3-phase signal light beams with their interference phases being shifted from each other by 120°. Although this optical system itself is known as a grating interferometer, interfering light striking the light-receiving unit, which is handled by the optical system, is premised on a so-called one color state. That is, it is assumed that when light beams are observed on the light-receiving surface of the light-receiving unit, the interference phases (light/dark) uniformly shifted as the diffraction grating GT2 moves. In practice, however, if such an encoder optical system is formed, a light/dark distribution may be generated, as shown in FIG. 2, due to the influences of the angle shift of the parallel mirror M1, the pitch mismatches between the diffraction grating GT1 and the diffraction grating GT2, the collimation property of parallel light beams, and the like. When these errors are large, this light/dark distribution can be observed as clear interference fringes. In contrast, when the errors are small, distributions corresponding to light/dark timings are generated. FIG. 3 shows these states. FIG. 3 shows how light/dark distributions are generated when one-cycle light/dark changes occur as the disk of the encoder rotates. It is therefore impossible to separate interference fringes close to a one color state from intrinsic light amount irregularity unless a light/dark phase changes.

Assume that such interference fringes or a light/dark change distribution (phase shifts) is generated. In this case, in the optical system in FIG. 1, it is possible to adjust the degree of horizontal interference fringes by changing the angle of a head unit HEAD relative to a disk unit DSK by an angle Δθ. It is also possible to adjust the degree of vertical interference fringes by shifting the head position by ΔR in the radial direction of the disk. It is therefore possible to converge interfering light to a one color state and fix the head position by observing one of three light beams via the light-receiving unit and combining two adjustments (Δθ, ΔR) based on the observation result. Using image information without any change will cause intensity irregularity and overlay various patterns on the information, resulting in adjustment based on human sensitivity. In addition, it is irrational to use a light-receiving unit different from the light-receiving unit for signal detection so as to separately detect phase shifts between light/dark changes in interference fringes. In this embodiment, therefore, sensors PDA, PDB, and PDC, each divided into four parts, respectively receive three light beams, and a signal processing unit (to be described later) combines outputs from the sensors. This makes it possible to output information associated with interference fringes (the directions of fringes and the density of fringes) as well as a 3-phase signal from the encoder. Note that one of outputs from the three sensors PDA, PDB, and PDB, each divided into four parts, may be used for the calculation of information associated with interference fringes.

Figure 4:
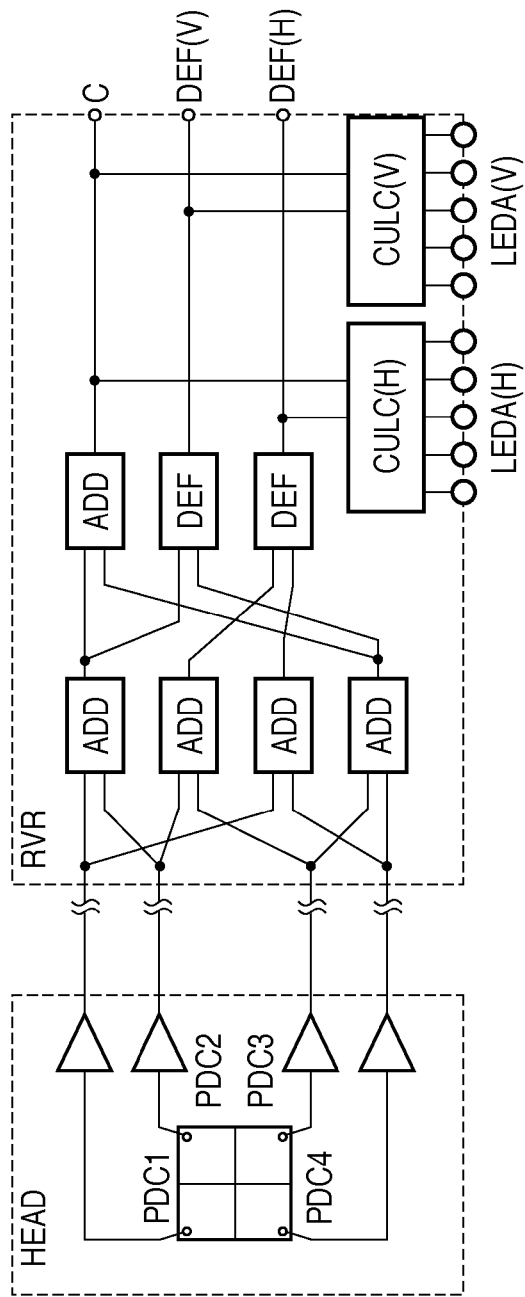
FIG. 4 is a view showing a signal processing procedure for calculating and displaying the one color degree of the encoder in the first embodiment.
Figure 5:
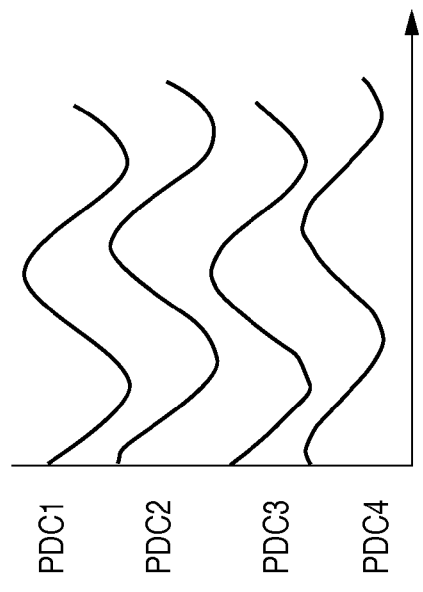
FIG. 5 is a graph showing output waveforms from the four divided light-receiving elements of the encoder in the first embodiment.

The signal processing unit will be described below. FIG. 4 is a block diagram of the signal processing unit according to the first embodiment, which particularly explains the calculation processing performed by the sensor PDC. The remaining sensors PDA and PDB respectively output an A-phase signal and a B-phase signal as the sum totals of signal components from the respective light-receiving elements of the sensors PDA and PDB. In the first embodiment, the four-divided sensor PDC includes a light-receiving area having a plurality of partial areas PDC1 to PDC4, and forms a light-receiving unit which receives interfering light at each of the partial areas PDC1 to PDC4. The four light-receiving cell outputs from the four-divided sensor PDC built in the head unit HEAD are transferred through a cable and input to a reception unit RVR for encoder signals. The reception unit RVR forms a processing unit which obtains an index indicating the uniformity of an interfering light phase distribution in the light-receiving area based on light reception results in the plurality of partial areas. FIG. 5 shows an example of signals input from the four light-receiving cells to the reception unit RVR. As is obvious, the light/dark timings of the four signals shift from each other due to a shift from a one color state, and phase shifts occur between the sinusoidal waveforms. The four input signals are converted into a signal based on the sum of the upper two signals, a signal based on the sum of the lower two signals, and are also converted into a signal based on the sum of the right two signals and a signal based on the sum of the left two signals. In the former case, the four partial areas PDC1 to PDC4 are divided into the first group of PDC1 and PDC2 on the upper side and the second group of PDC3 and PDC4 on the lower side. In the latter case, the four partial areas PDC1 to PDC4 are divided into the first group of PDC1 and PDC3 on the left side and the second group of PDC2 and PDC4 on the right side. Thereafter, a summation signal C of the light reception results in the four partial areas is generated and output as a C-phase signal. In addition, two signals, that is, an upper/lower difference signal DEF(V) and a left/right difference signal DEF(H), are generated, and output for a monitor, as needed.

Rotating the disk by some operation (in practice, rotating the disk by slight vibration at the time of adjustment) can obtain a periodic signal because the light/dark phases of interfering light vary. If interference fringes are in a one color state, the amplitude of each difference signal becomes a minimum value, and the amplitude of the summation signal C becomes a maximum value. Assume that an imaging device CCD images a light beam striking the light-receiving element PDC. In this case, if interference fringes are formed, they should look swinging. If horizontal fringes (H-axis direction) are formed, the amplitude of the difference signal DEF(H) is not zero. If vertical fringes (V-axis direction) are formed, the amplitude of the difference signal DEF(V) is not zero. If, however, interference fringes can be adjusted to an ideal one color state, the summation signal C becomes maximum, and the difference signals DEF(H) and DEF(V) become zero. It is therefore possible to determine the directions and amount of fringes by outputting these three signal from output terminals and monitoring them as waveforms with an oscilloscope, as shown in FIG. 5. This makes it possible to effectively make the adjustment converge. In order to facilitate the operation, however, in this embodiment, the encoder signal reception unit RVR includes one color degree determination circuits CULC(H) and CULC(V) and LED displays LEDA(H) and LEDA(V). This arrangement allows the operator to adjust the posture of the encoder based on the information.

The calculation unit CULC(V) calculates a one color degree OC(V) as an index indicating the uniformity of the phase distribution of interfering light in the V-axis direction by using the upper/lower difference signal DEF(V) and the summation signal C of signals from all the elements according to equation (1):

$$OC(V)=DEF(V)/C \quad (1)$$

The calculation unit CULC(V) changes the ON state of the light-emitting diode array display LEDA(V) in accordance with the value of the one color degree OC(V) in the V-axis direction. When the one color degree OC(V) is 0, a "one color state" is obtained. When, for example, the one color degree is 0.2 or less, five light-emitting diodes are turned on. When the one color degree is 0.4 to 0.2, four light-emitting diodes are turned on. When the one color degree is near 1, all the light-emitting diodes are turned off.

The calculation unit CULC(H) calculates a one color degree OC(H) in the H-axis direction by using the left/right difference signal DEF(H) and the summation signal C of signals from all the elements according to equation (2):

$$OC(H)=DEF(H)/C \quad (2)$$

The calculation unit CULC(H) changes the ON state of the display LEDA(V) formed by a light-emitting diode array in accordance with the value of the one color degree OC(H) in the H-axis direction. When the one color degree OC(H) is 0, a "one color state" is obtained. When, for example, the one color degree is 0.2 or less, five light-emitting diodes are turned on. When the one color degree is 0.4 to 0.2, four light-emitting diodes are turned on. When the one color degree is near 1, all the light-emitting diodes are turned off.

All the light-emitting diodes of the display LEDA(H) are turned on while the angle Δθ of the head is adjusted. In addition, it is possible to adjust interference fringes to a one color state by turning on all the light-emitting diodes of the display LEDA(V) while adjusting the position ΔR of the head. Note that it is possible to display the information of a one color degree by changing the color of a light-emitting diode to red, orange, yellow, green, blue, or the like or changing the blinking state of a light-emitting diode instead of changing the number of light-emitting diodes to be turned on. Furthermore, if the one color degree required differs depending on the specifications of an interferometer, the threshold can be changed as needed.

[Second Embodiment]

Figure 6:
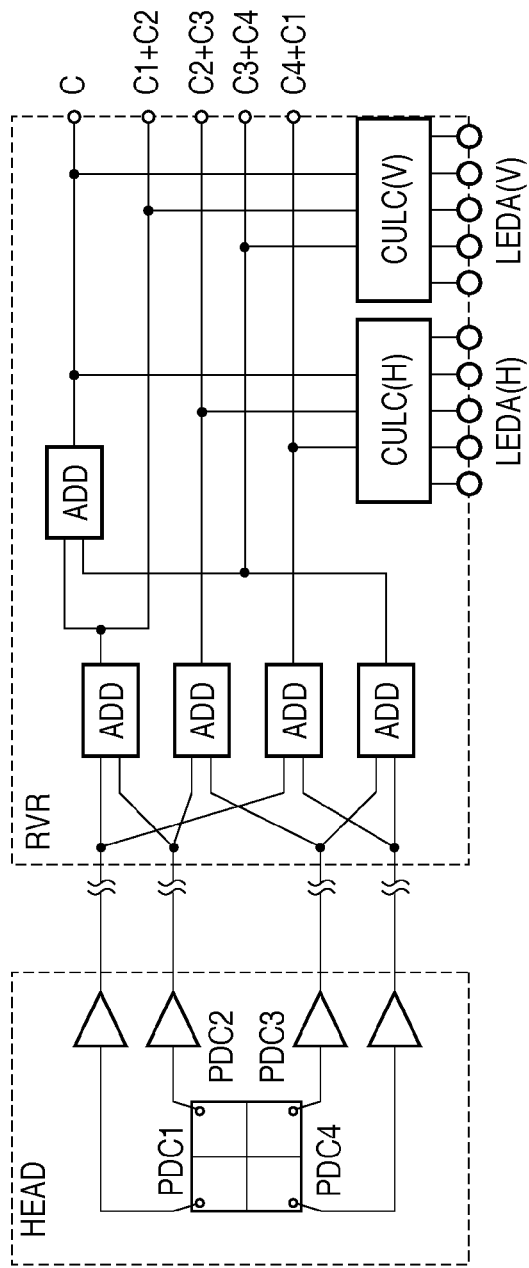
FIG. 6 is a signal processing procedure for calculating and displaying the one color degree of an encoder in the second embodiment.
Figure 7:
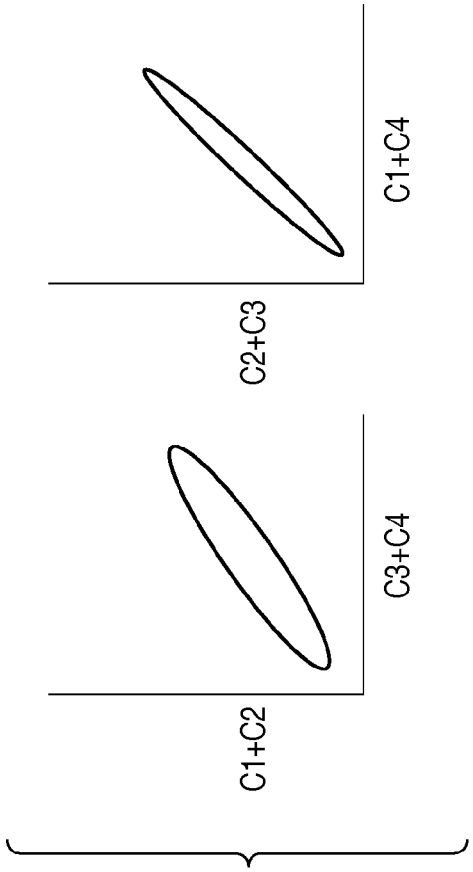
FIG. 7 is a view showing Lissajous figures from the four divided light-receiving elements of the encoder in the second embodiment.

A method of determining a one color degree in the second embodiment will be described next with reference to FIG. 6. When it is necessary to strictly adjust a one color degree to near zero, the method in the first embodiment, which is based on only the amplitudes of difference signals, is insufficient because there is light amount irregularity within a cross-section of a light beam in practice. In this case, phase differences within the cross-section of the light beam are detected. A state in which the upper/lower and left/right phase differences are zero is a one color state in a strict sense. In practice, when, for example, the light amount ratio between the right and left halves of a light beam is 1:2, the left/right difference signal does not become zero even in a one color state. The disk is rotated by some operation (rotated with slight vibration at the time of adjustment) to change light/dark phases, thereby generating a periodic signal. This will obtain a Lissajous figure between temporal changes in the summation signal (C1+C2) of the signals obtained by the upper two of the four light-receiving elements of a sensor PDC and temporal changes in the summation signal (C3+C4) of the signals obtained by the lower two of the four light-receiving elements. This will also obtain a Lissajous figure between temporal changes in the summation signal (C2+C3) of the signals obtained by the right two of the four light-receiving elements and temporal changes in the summation signal (C4+C1) of the signals obtained by the left two of the four light-receiving elements. It is possible to achieve a one color state by making adjustments so as to make the two Lissajous figures become linear instead of becoming elliptic. Note that these four signals may be monitored as two kinds of Lissajous figures with an oscilloscope, as shown in FIG. 7. This embodiment includes circuits CULC(H) and CULC(V) which determine a one color degree, display units LEDA(H) and LEDA(V), and a reception unit RVR, and allows an operator to adjust the posture of the encoder based on the information obtained by these components.

In the calculation unit CULC(V), a register saves a pair of the values of the two summation signals (C1+C2) and (C3+C4). The disk is relatively rotated, and pieces of information of a plurality of pairs of summation signals are sequentially saved in the register. Calculating a Lissajous figure using these pieces of saved information can obtain the ellipticity (linearity) of the Lissajous figure, thus finally calculating a one color degree in the V-axis direction. Likewise, when calculating a one color degree in the H-axis direction, a pair of the values of the two summation signals (C2+C3) and (C1+C4) is saved in the register. The disk is relatively rotated, and pieces of information of a plurality of pairs of summation signals are sequentially saved in the register. Calculating a Lissajous figure using these pieces of saved information can obtain the ellipticity (linearity) of the Lissajous figure, thus finally calculating a one color degree in the H-axis direction. The ellipticity of a Lissajous figure in the second embodiment is an index indicating the uniformity of the phase distribution of interfering light in the light-receiving area. These pieces of one color degree information are expressed by the number of light-emitting diodes to be turned on as in the first embodiment. It is therefore possible to make adjustments to achieve a one color state by turning on all the light-emitting diodes of the display LEDA(H) while adjusting an angle Δθ of the head and also turning on all the light-emitting diodes of the display LEDA(V) while adjusting a position ΔR of the head. Note that the display scheme of the information of a one color degree can be changed as in the first embodiment.

[Third Embodiment]

Figure 8:
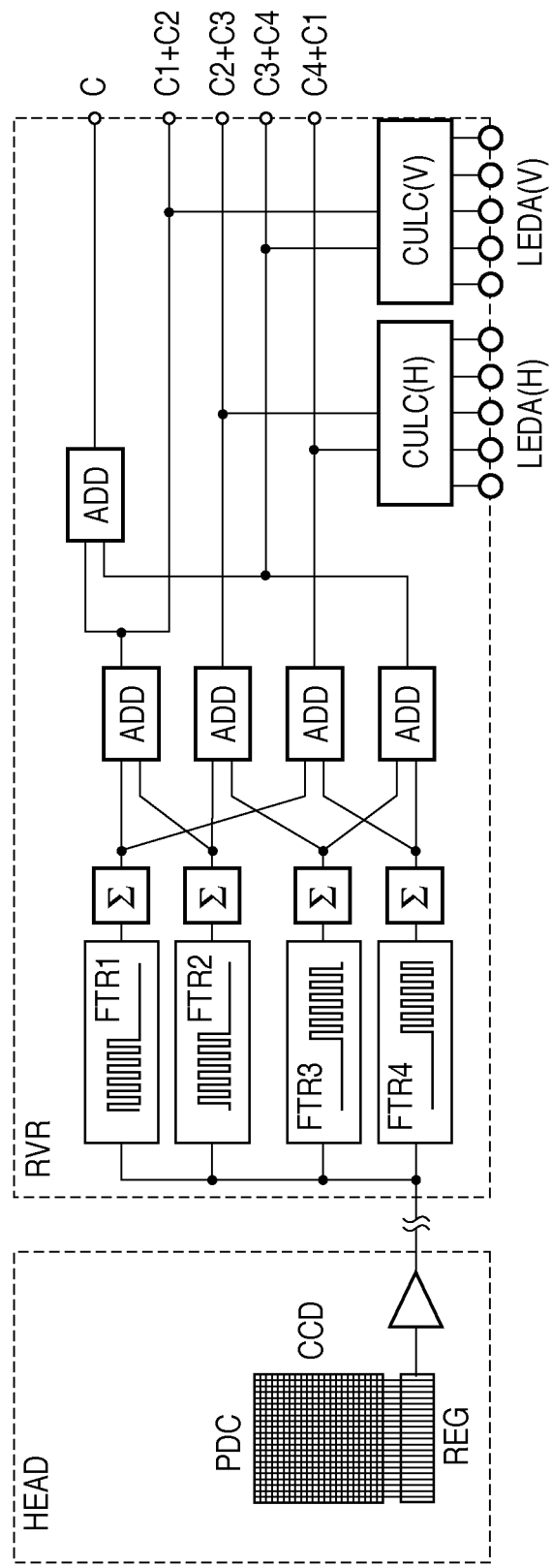
FIG. 8 is a view showing a signal processing procedure for calculating and displaying the one color degree of an encoder in the third embodiment.

A method of determining a one color degree in the third embodiment will be described next based on FIG. 8. This embodiment uses an imaging device such as a CCD as a light-receiving element for each phase in place of a four-divided light-receiving element. Each imaging device such as a CCD periodically outputs signals from two-dimensionally arrayed photoelectric conversion elements (light-receiving cells) as a serial signal based on a clock signal. It is therefore possible to extract selected area portions by using filters FTR1, FTR2, FTR3, and FTR4 on the assumption of, for example, a four-divided light-receiving element. The filters FTR1, FTR2, FTR3, and FTR4 respectively transmit pieces of information of light-receiving cells corresponding to the areas of light-receiving elements PDC1, PDC2, PDC3, and PDC4. It is possible to calculate and display a one color degree by the same signal processing as that in the first or second embodiment and to adjust the posture of the encoder based on the displayed information.

The first to third embodiments of the present invention have been described above. Obviously, however, the present invention is not limited to these embodiments. Various modifications and changes of the embodiments can be made within the spirit and scope of the present invention. For example, an interferometer to which the present invention is applied is not limited to the diffraction interference type rotary encoder of each embodiment. The present invention can be widely applied to one color adjustment for rotary encoders, linear encoders, and interferometers with various optical paths. It is possible to determine a one color degree by a combination of the method of performing determination based on the amplitudes of difference signals and the method of performing determination using Lissajous figures. In addition, in place of the three four-divided sensors for the reception of phase difference signals, two or four four-divided sensors may be used. In this case, the encoder or interferometer outputs a phase difference signal as a 2- or 4-phase signal. In addition, a one color degree may be determined by using either of the above signals.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-128276 filed Jun. 3, 2010, which is hereby incorporated by reference herein in its entirety.

What is claimed is:

1. An interferometer which measures a displacement of an object to be measured by observing a fluctuation in intensity of interfering light generated by dividing light emitted from a light source into two light beams and overlaying the two light beams including a light beam from the object, the interferometer comprising:
a light-receiving unit including a light-receiving area including a plurality of partial areas and configured to detect a light intensity distribution in one beam of the interfering light by the plurality of partial areas and configured to detect light intensity in each part of the one beam of the interfering light by each of the plurality of partial areas and output each signal about the light intensity detected by each partial area, the light intensity distribution being a distribution in the light-receiving area; and
a processing unit configured to calculate a value of an index indicating a phase shift in the one beam of the interfering light using a difference between the signals output from the plurality of partial areas,
wherein the value of the index indicating the phase shift in the one beam of the interfering light changes with an adjustment of the interferometer.

2. The interferometer according to claim 1, wherein the plurality of partial areas are divided into two groups including a first group and a second group, and said processing unit calculates, as a value of the index, a value obtained by dividing a difference between a sum of intensities of the interfering light received in the partial areas belonging to the first group and a sum of the intensities of interfering light received in the partial areas belonging to the second group by a sum total of intensities of the interfering light respectively received in the plurality of partial areas.

3. The interferometer according to claim 1, wherein said processing unit divides the plurality of partial areas into two groups including a first group and a second group, and calculates, as a value of the index, a value of ellipticity of a Lissajous figure between temporal changes in a sum of intensities of the interfering light received in the partial areas belonging to the first group and temporal changes in a sum of intensities of the interfering light received in the partial areas belonging to the second group.

4. The interferometer according to claim 1, wherein said light-receiving unit comprises an imaging device in which a plurality of photoelectric conversion elements are two-dimensional arrayed, and each of the partial areas includes at least one of the photoelectric conversion elements.

5. The interferometer according to claim 1, further comprising:
a head unit including said light-receiving unit and configured to emit light to the object,
wherein a rotational angle or a position of the head relative to the object is configured to be changed.

6. The interferometer according to claim 1, wherein the object to be measured comprises a rotating body.

7. The interferometer according to claim 5, wherein the rotational angle or the position of the head relative to the object is adjusted so that the phase shift in the one beam of the interfering light comes close to zero.

8. The interferometer according to claim 5, wherein said processing unit calculates:
a value of a first index indicating a phase shift between the interfering light received in the partial area on the upper side of the plurality of partial areas and the interfering light received in the partial area on the lower side of the plurality of partial areas, the value of the first index being depending on the position of the head relative to the object, and
a value of a second index indicating a phase shift between the interfering light received in the partial area on the right side of the plurality of partial areas and the interfering light received in the partial area on the left side of the plurality of partial areas, the value of the second index being depending on the rotational angle of the head relative to the object.

9. The interferometer according to claim 1, wherein the interferometer is adjusted on the value of the index so that the phase shift in the one beam of the interfering light is decreased.

10. The interferometer according to claim 1, wherein the value of the index indicates the uniformity of the phase distribution in the one beam of the interfering light on the light-receiving area.

11. The interferometer according to claim 1, wherein the interferometer is a diffraction interference type encoder.

* * * * *